United States Patent
Okamoto et al.

(10) Patent No.: US 6,716,792 B2
(45) Date of Patent: Apr. 6, 2004

(54) COMPOUND, OXIDE OR LEWIS ACID OF METAL CARRIED ON CROSSLINKED POLYMER

(75) Inventors: Kuniaki Okamoto, Saitama (JP); Mutsumi Sato, Saitama (JP); Atsunori Sano, Saitama (JP)

(73) Assignees: Wako Pure Chemical Industries, Ltd., Osaka (JP); Shu Kobayashi, Tokyo (JP)

( * ) Notice: Subject to any disclaimer, the term of this patent is extended or adjusted under 35 U.S.C. 154(b) by 0 days.

(21) Appl. No.: 09/881,214

(22) Filed: Jun. 15, 2001

(65) Prior Publication Data

US 2002/0045708 A1 Apr. 18, 2002

(30) Foreign Application Priority Data

Jun. 15, 2000 (JP) .......................................... 2000-179823

(51) Int. Cl.$^7$ .............................. B01J 20/26; B01J 32/00; C08F 4/02

(52) U.S. Cl. .................................... 502/402; 525/327.3

(58) Field of Search ......................... 525/327.3; 502/402

(56) References Cited

U.S. PATENT DOCUMENTS 4,246,134 A * 1/1981 Uvarov et al. .............. 526/141

FOREIGN PATENT DOCUMENTS

| CS | 267459 B1 * | 2/1990 |
| DE | 124047 Z * | 2/1977 |
| DE | 287513 A5 * | 2/1991 |
| EP | 0 823 450 | 2/1998 |
| EP | 0 900 809 | 3/1999 |
| FR | 2 774 994 | 8/1999 |
| JP | 7-268155 A2 * | 10/1995 |
| SU | 789528 B * | 12/1980 |
| SU | 1050163 A1 * | 4/1987 |

OTHER PUBLICATIONS

Chemical abstracts accession No. 1997:166214, Balakrishnan et al., "Polymer–supported reagents. II. Kinetics of esterification of acrylic acid with n–butanol using polymer supported . . . ," Journal of Polymer Science (1997), vol. 35, No. 4, abstract.*
Chemical absracts accession No. 1997:343840, Herrmann et al., "Polymer–bound osmium oxide catalysts," Journal of Molecula Catalysis A: Chemical (1997), vol. 120, Nos. 1–3, abstract.*
Chemical abstracts accession No. 1997:651673, Lu et al., "Cationic polymerization of alpha–pinene with PS–SbCl3/AlCl3," Gaofenzi Cailiao Kexue Yu Gongcheng (1997), vol. 13, No. 5, abstract.*
Chemical abstracts accession No. 1983:494321, Kalalova et al., "Nickel (III) complexes on a sorbent," Sbornik Vysoke Skoly Chemicko–Technologicke v Praze (1983), B28, abstract.*
Chemical abstracts accession No. 1989:533619, Cainelli et al., "Catalytic hydroxylation of olefins by polymer–bound osmium tetroxide," Synthesis (1989), vol. 1, abstract.*
Chemical abstracts accession No. 1993:105263, Xavier et al., "Polymer–supported palladium and platinum species as hydrogenation catalysts," Journal of Polymer Science, Part A: Polymer Chemistry (1992), vol. 30, No. 13, abstract.*
Chemical abstracts accession No. 19993:234643, Poornanandhan et al., Polymer–supported redox catalysts for polymerization Polymer (1993), vol. 34, No. 7, abstract.*
S. Kobayashi et al.; J. Am. Chemical Society, vol. 120, No. 12, pp. 2985–2986, 1998.
S. Nagayama et al.; J. Org. Chem., vol. 63, No. 18, pp. 6094–6985, 1998.
S. Kobayashi et al.; J. Am. Chem. Soc., vol. 121, No. 48, pp. 11229–11239, 1999.
Patent Abstract of Japan No. 11–70331, Mar. 16, 1999.
Patent Abstract of Japan No. 9–249812, Sep. 22, 1997.
Patent Abstract of Japan No. 11–347400, Dec. 21, 1999.
Patent Abstract of Japan No. 11–133600, May 21, 1999.

* cited by examiner

*Primary Examiner*—Robert E. L. Sellers
(74) *Attorney, Agent, or Firm*—Armstrong, Kratz, Quintos, Hanson & Brooks, LLP

(57) ABSTRACT

The present invention relates to ① a metal oxide or metallic Lewis acid composition comprising the metal oxide or the metallic Lewis acid carried on a cross-linked polymer compound, ② a metal compound composition comprising the metal compound carried on a cross-linked product of a polymer compound containing a cross-linkable condensing functional group and/or a polymer containing a polymerizable double bond formed by a condensation reaction, ③ a method for producing a metal compound composition comprising the metal compound carried on a cross-linked polymer compound, which comprises mixing a non-cross-linked polymer compound containing a cross-linkable condensing functional group and/or a polymer compound containing a polymerizable double bond formed by a condensation reaction with a metal compound, and then cross-linking the polymer compound, ④ a carrier for carrying a metal compound comprising a 1st polymer compound containing a cross-linkable condensing functional group and/or a 2nd polymer compound containing a polymerizable double bond formed by a condensation reaction as a non-cross-linked polymer compound and ⑤ a method for improving solvent resistance, heat resistance and durability of a metal compound comprising mixing a non-cross-linked polymer compound containing a cross-linkable condensing functional group and/or a polymer compound containing a polymerizable double bond formed by a condensation reaction with a metal compound, and then cross-linking said polymer compounds.

29 Claims, No Drawings

COMPOUND, OXIDE OR LEWIS ACID OF METAL CARRIED ON CROSSLINKED POLYMER

BACKGROUND OF THE INVENTION

The present invention relates to a metal oxide and Lewis acid, for instance, carried on a polymer compound, which shows excellent solvent resistance, heat resistance, etc. and is not degraded in its activity even after repeating use.

It has heretofore been tried that metal oxides such as an osmium oxide which has high toxicity and is not easy to handle and a compound such as a Lewis acid having catalytic activity are made into micro-capsulated preparation with the use of an olefin type polymer such as polystyrene, whereby its handling becomes easy and its solvent resistance is increased (JACS 1998, 120, 2985; JOC 1998, 63, 6094; JACS 1999, 121, 11229). In those micro-capsulated metal oxides, repeating use becomes possible to some extent because of improvement of solvent resistance. However, the solvent resistance is not yet enough, and usable solvents and substrates have been restricted. Therefore, it has long been desired to provide catalytic active compositions such as metal oxides and Lewis acids whose solvent resistances are further increased.

SUMMARY OF THE INVENTION

The present invention has been accomplished under the situation as mentioned above and the object is to provide a catalytic active substance such as a metal oxide and a Lewis acid which shows excellent solvent resistance and heat resistance, and is not degraded in its activity even after repeating use and also handled easily.

The present invention relates to ① a metal oxide or metallic Lewis acid composition comprising the metal oxide or the metallic Lewis acid carried on a cross-linked polymer compound, ② a metal compound composition comprising the metal compound carried on a cross-linked product of a polymer compound containing a cross-linkable condensing functional group and/or a polymer containing a polymerizable double bond formed by a condensation reaction, ③ a method for producing a metal compound composition comprising the metal compound carried on a cross-linked polymer compound, which comprises mixing a non-cross-linked polymer compound containing a cross-linkable condensing functional group and/or a polymer compound containing a polymerizable double bond formed by a condensation reaction with a metal compound, and then cross-linking the polymer compound, ④ a carrier for carrying a metal compound comprising a 1st polymer compound containing a cross-linkable condensing functional group and/or a 2nd polymer compound containing a polymerizable double bond formed by a condensation reaction as a non-cross-linked polymer compound and ⑤ a method for improving solvent resistance, heat resistance and durability of a metal compound comprising mixing a non-cross-linked polymer compound containing a cross-linkable condensing functional group and/or a polymer compound containing a polymerizable double bond formed by a condensation reaction with a metal compound, and then cross-linking said polymer compounds.

DETAILED DESCRIPTION OF THE PREFERRED EMBODIMENTS

The non-cross-linked polymer compound used in the present invention includes a 1st polymer compound containing a cross-linkable condensing functional group which has an ability of cross-linking, a 2nd polymer compound containing a polymerizable double bond, and a polymer compound comprising the 1st polymer compound and the 2nd polymer compound.

The cross-linkable condensing functional group which has an ability of cross-linking in the above 1st polymer compound means not one participated in a cross-linking reaction by splitting a double bond, such as a polymerizable double bond, but one which can cross-linking by forming a new chemical bond by a condensation reaction with other functional group, and includes an epoxy group, a carboxyl group, a hydroxyl group, an isocyanate group, an isothiocyanate group, an amino group, etc.

The 1st polymer compound includes the following.

[I] Those obtained by polymerizing or copolymerizing one or two or more kinds of a monomer containing a cross-linkable condensing functional group and a polymerizable double bond, if necessary, together with a monomer containing a polymerizable double bond.

The monomer containing the cross-linkable condensing functional group and the polymerizable double bond include the followings.

(1) Glycidyl compound containing an epoxy group as a cross-linkable condensing functional group selected from glycidyl ethers or glycidyl esters shown by the general formula [1] or [2]

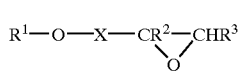   [1]

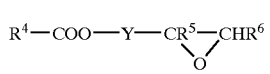   [2]

wherein $R^2$, $R^3$, $R^5$ and $R^6$ are each independently a hydrogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, X and Y are each independently a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, $R^1$ and $R^4$ are each independently a group shown by the following general formula [3]

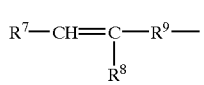   [3]

wherein $R^7$ is a hydrogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, $R^8$ is a hydrogen atom, a cyano group or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, and $R^9$ is a direct link, a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 9 carbon atoms, such as a phenylene group or an aryl lower alkylene group having 7 to 12 carbon atoms, such as a phenylmethylene group and a phenylethylene group, and $R^2$ may form a 3- to 6-membered ring together with $R^3$ or with a carbon atom in X, and $R^5$ may form a 3- to 6-membered ring together with $R^6$ or with a carbon atom in Y.

The typical examples shown by the above general formnula [1] or [2] are glycidyl acrylate, glycidyl methacrylate, glycidyl cyanoacrylate, glycidyl α-ethylacrylate, glycidyl α-n-propylacrylate, glycidyl α-n-butylacrylate, 3,4-epoxybutyl acrylate, 3,4-epoxybutyl methacrylate, 6,7-epoxyheptyl acrvlate, 6,7-epoxyheptyl methacrylate, 6,7-epoxyheptyl α-ethylacrylate, 3,4-epoxycyclobexyl acrylate, 3,4-epoxycyclohexylmethyl methylmethacrylate, 2,3-epoxycyclohexyl acrylate, 2,3-epoxycyclohexyl methacrylate, glycidyl p-vinylbenzoate, glycidyl o-vinylbenzoate, glycidyl m-vinylbenzoate, glycidyl p-vinylphenylacetate, glycidyl o-vinylphenylacetate, glycidyl m-vinylphenylacetate, o-vinylbenzyl glycidyl ether, vinylphenyl glycidyl ether, m-vinylbenzyl glycidyl ether, p-vinylbenzyl glycidyl ether, etc.

(2) A monomer containing a carboxyl group as a cross-linkable condensing functional oup shown by the following general formula [4]

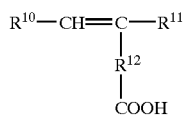

$$\text{[4]}$$

wherein $R^{10}$ is a hydrogen atom or a straight chained, branched or cyclic lower alkyl group having 1 to 6 carbon atoms such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, $R^{11}$ is a hydrogen atom, a straight chained, branched or cyclic lower alkyl group having 1 to 6 carbon atoms such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopen- tyl group and a cyclohexyl group, an aryl group having 6 to 9 carbon atoms such as a phenyl group or an aralkyl group having 7 to 12 carbon atoms such as a benzyl group and a phenylethyl group, and an aromatic ring in the above aryl group or aralkyl group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc., and $R^{12}$ is a direct link, a straight chained, branched or cyclic lower alkylene group having 1 to 6 carbon atoms, such as a methylene group, an ethylene group, a trimethylene group, a propylene group, a methylmetbylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 9 carbon atoms such as a phenylene group or an aryl lower alkylene group having 7 to 12 carbon atoms such as a phenylmethylene group and a phenylethylene group.

(3) A monomer containing a hydroxyl group or an acyloxy group as a cross-linkable condensing functional group shown by the following general formula [5]

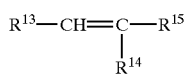

$$\text{[5]}$$

wherein $R^{13}$ is a hydrogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, $R^{14}$ is a hydroxyl group, a lower hydroxyalkyl group having 1 to 6 carbon atoms such as a hydroxymethyl group, a 1-hydroxyethyl group, a 2-hydroxyethyl group, a 1-hydroxy-n-propyl group, a 2-hydroxy-n-propyl group, a 3-hydroxy-n-propyl group, a 2-hydroxyl-methylethyl group, a 1-hydroxy-1-methylethyl group, a 1-hydroxy-n-butyl group, a 2-hydroxy-n-butyl group, a 3-hydroxy-n-butyl group, a 4-hydroxy-n-butyl group, a 3-hydroxy-2-methylpropyl group, a 2-hydroxy-2-methylpropyl group, a 1-hydroxy-2-methylpropyl group, a 3-hydroxy-1-methylpropyl group, a 2-hydroxy-1-methylpropyl group, a 1-hydroxy-1-methylpropyl group, a 1-hydroxypentyl group, a 2-hydroxypentyl group, a 3-hydroxypentyl group, a 4-hydroxypentyl group, a 5-hydroxypentyl group, a 4-hydroxy-1-methylbutyl group, a 3-hydroxy-1-ethylpropyl group, a 1-hydroxy-1-ethylpropyl group, a 1-hydroxy-n-hexyl group, a 3-hydroxy-n-hexyl group, a 6-hydroxy-n-hexyl group, a 5-hydroxy-3-pentyl group, a 4-hydroxy-1,1-dimethylbutyl group, a 1-hydroxycyclopropyl group, a 2-hydroxycyclopropyl group, a 1-hydroxycyclopentyl group, a 2-hydroxycyclopentyl group, a 3-hydroxycyclopentyl group, a 1-hydroxycyclohexyl group, a 2-hydroxycyclohexyl group, a 3-hydroxycyclohexyl group and a 4-hydroxycyclohexyl group, a hydroxyaryl group having 6 to 9 carbon atoms such as a 2-hydroxyphenyl group, a 3-hydroxyphenyl group and 4-hydroxyphenyl group, a hydroxyaralkyl group having 7 to 12 carbon atoms such as a hydroxybenzyl group, a lower acyloxy group having 2 to 6 carbon atoms such as an acetyloxy group, a propionyloxy group, a butylyloxy group, a valeryloxy group and a hexanoyloxy group or an aryl acyloxy group having 8 to 15 carbon atoms such as a benzoyloxy group and a naphthoyloxy group, and an aromatic ring in the above hydroxyaryl group, hydroxyaralkyl group and arylacyloxy group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc., $R^{15}$ is a hydrogen atom, a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, an aryl group having 6 to 9 carbon atoms such as a phenyl group or an aralkyl group having 7 to 12 carbon atoms such as a benzyl group and a phenylethyl group, and an aromatic ring in the above aryl group or aralkyl group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc.

(4) A monomer containing an isocyanate group or an isothiocyanate group as a cross-linkable condensing functional group shown by the following general formula [6]

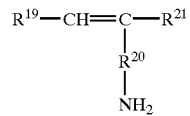

[6]

wherein $R^{16}$ is a hydrogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, $R^{17}$ is a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 18 carbon atoms such as a phenylene group and a naphthylene group or an aryl lower alkylene group having 7 to 20 carbon atoms such as a phenylmethylene group, a phenylethylene group and a naphthylmethylene group, A is an oxygen atom or a sulfur atom, an aromatic ring in the above arylene group or aryl lower alkylene group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro atom, etc., and $R^{18}$ is a hydrogen atom, a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, an aryl group having 6 to 9 carbon atoms such as a phenyl group or an aralkyl group having 7 to 12 carbon atoms such as a benzyl group and a phenylethyl group, and an aromatic ring in the above aryl group or aralkyl group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc.

(5) A monomers containing an amino group as a cross-linkable condensing functional group shown by the following general formula [7]

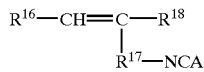

[7]

wherein $R^{19}$ is a hydrogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, $R^{20}$ is a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 18 carbon atoms such as a phenylene group and a naphthylene group or an aryl lower alkylene group having 7 to 20 carbon atoms such as a phenylmethylene group, a phenylethylene group and a naphthylmethylene group, and an aromatic ring in the above arylene group or aryl lower alkylene group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc., and $R^{21}$ is a hydrogen atom, a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, an aryl group having 6 to 9 carbon atoms such as a phenyl group or an aralkyl group having 7 to 12 carbon atoms such as a benzyl group and a phenylethyl group, and an aromatic ring in the above aryl group or aralkyl group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc.

In those monomers (1) to (5), a polymer is formed by a splitting of the polymerizable double bond, and the polymer has a structure that the condensing functional groups are pendant on the side chains of the repeating units.

The produced polymer comprises one or more of the following repeating units.

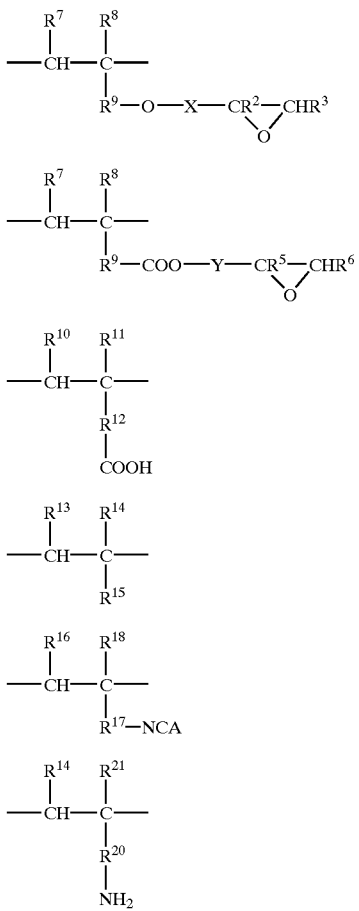

The monomer containing the polymerizable double bond which is, upon necessity, combined in copolymerization of the above monomer (1) to (5) includes one shown by the following general formula [8]

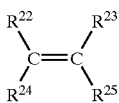

[8]

wherein $R^{22}$ and $R^{23}$ are each independently a hydrogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, $R^{25}$ is a hydrogen atom, a halogen atom or a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group and $R^{24}$ is a cyano group, a carboxyl group, a carboxyamide group, a hydroxyl group, a lower acyloxy group having 2 to 6 carbon atoms such as an acetyloxy group, a propionyloxy group, a butylyloxy group, a valeryloxy group and a hexanoyloxy group, an arylacyloxy group having 7 to 15 such as a benzoyloxy group and a naphthoyloxy group, a lower alkoxycarbonyl group having 2 to 6 carbon atoms such as a methoxycarbonyl group, an ethoxycarbonyl group, a propyloxycarbonyl group, a butoxycarbonyl group, a pentyloxycarbonyl group and a hexyloxycarbonyl group, a straight chained, branched or cyclic lower alkyl group having 1 to 6 carbon atoms, such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a cyclopropyl group, a cyclopentyl group and a cyclohexyl group, an aryl group having 6 to 9 carbon atoms such as a phenyl group or an aralkyl group having 7 to 12 carbon atoms such as a benzyl group, and an aromatic ring in the above aryl group and aralkyl group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyl group and a butyl group, a halogen atom and a nitro group.

The typical examples of the above compounds are acrylic acid, a lower alkyl ester of acrylic acid such as methyl acrylate, ethyl acrylate, propyl acrylate, butyl acrylate, pentyl acrylate and hexyl acrylate, methacrylic acid, a lower alkyl ester of methacrylic acid such as methyl methacrylate, ethyl methacrylate, propyl methacrylate, butyl methacrylate, pentyl methacrylate and hexyl methacrylate, acrylonitrile, methacrylonitrile, styrene, methylstyrene, vinyltoluene, vinyl chloride, vinylidene chloride, vinyl acetate, acrylamide, methacrylamide, etc.

When this monomer of the general formula [8] is also used, the produced polymer contains also the following repeating unit in its molecule.

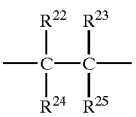

[8']

In the 1st polymer compound produced by copolymerization using also the monomer of the general formula [8], a content of the monomer unit shown by the general formulas [1'], [2'], [4'], [5'], [6'] and [7'] originated from the monomer (1) to (5) is 0.0001 to 0.02 mol, preferably 0.001 to 0.01 mol relative to 1 g of the 1st polymer compound, so that the catalytic activity of the metal compound which is carried on a cross-linked polymer compound can effectively be shown.

[II] Those obtained by polymerizing or copolymerizing one or two or more kinds of an amino acid having three or more cross-linkable condensing functional group such as a carboxyl group, an amino group and a hydroxyl group, which is shown by the following general formula [9]

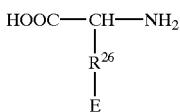 [9]

wherein E is a carboxyl group, a hydroxyl group or an amino group and $R^{26}$ is a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 18 carbon atoms such as a phenylene group and a naphthylene group or an aryl lower alkylene group having 7 to 20 carbon atoms such as a phenylmethylene group, a phenylethylene group and a naphthylmethylene group, and a aromatic ring in the above arylene group or aryl lower alkylene group may have a substituent including a lower alkyl group having 1 to 4 carbon atoms such as a methyl group, an ethyl group, a propyl group and a butyl group, a lower alkoxy group having 1 to 4 carbon atoms such as a methoxy group, an ethoxy group, a propyloxy group and a butoxy group, a halogen atom, a nitro group, etc.

In those monomers, a polymer is formed by a dehydrating condensation reaction of the amino group with the carboxyl group under dehydration, and thus produced polymer has such a structure that a condensing functional group is pendent on the side chain of the repeating unit of the polymer.

The polymer is, for instance, composed of the following repeating unit

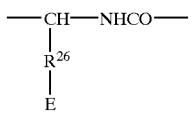 [9']

[III] Polymeric epoxy compounds shown by the following general formula [10], which is obtained from the corresponding epihalohydrin and biphenol compounds.

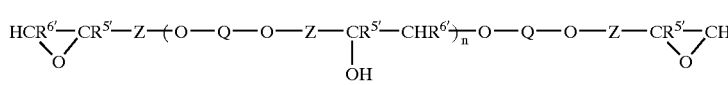 [10]

wherein $R^{5'}$ and $R^{6'}$ have each independently the same meaning as above $R^5$ and $R^6$, Z is a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, n is an integer of generally 1 to 100, preferably 1 to 30, and Q is a group shown by the following general formula [11]

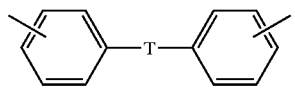 [11]

wherein T is a direct link or a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group.

The 2nd polymer compound includes polymers obtained by condensation polymerization of a polycarboxylic acid containing a polymerizable double bond with a polyhydroxy compound, polymers obtained by condensation polymerization of a polycarboxylic acid containing a polymerizable double bond with a polyamine compound, etc., which are specifically exemplified by an unsaturated polyester shown by the following general formula [12], an unsaturated polyamide shown by the following general formula [13].

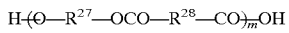 [12]

wherein $R^{27}$ is a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 9 carbon atoms such as a phenylene group or an aryl lower alkylene group having 7 to 12 carbon atoms such as a phenylmethylene group and a phenylethylene group, $R^{28}$ is a straight chained, branched or cyclic alkenylene group having 2 to 6 arbon atoms such as a vinylene group, a propenylene group, a 1-butenylene group, a 2-butenylene group, a 1-pentenylene group, a 2-pentenylene group, a 3-pentenylene group, a 1-hexenylene group, a 2-hexenylene group, a 3-hexenylene group, a 2,4-he adienylene group, a 1-methyl-2-butenylene group, a 3-cyclohexen-1,2-ylene group and a 2,5-cyclohexadien-1,4-ylene group, and m is generally 10 to 2000, preferably 50 to 1000.

In the above, a saturated aliphatic dicarboxylic acid may be co-used together with a polycarb xylic acid containing a polymerizable double bond and a polyhydroxy compound.

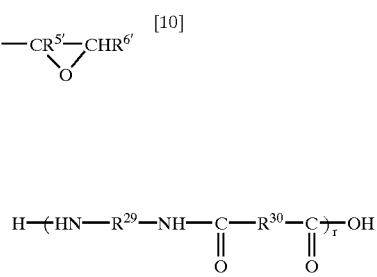 [13]

wherein $R^{29}$ is a straight chained, branched or cyclic lower alkylene group having 1 to 6 carbon atoms, such as a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group and a cyclohexylene group, an arylene group having 6 to 9 carbon atoms such as a phenylene group or an aryl lower alkylene group having 7 to 12 carbon atoms such as a phenylmethylene group and a phenylethylene group, $R^{30}$ is a straight chained, branched or cyclic alkenylene group having 2 to 6 carbon atoms such as a vinylene group, a propenylene group, a 1-butenylene group, a 2-butenylene group, a 1-pentenylene group, a 2-pentenylene group, a 3-pentenylene group, a 1-hexenylene group, a 2-hexenylene group, a 3-hexenylene group, a 2,4-he) adienylene group, a 1-methyl-2-butenylene group, a 3-cyclohexen-1,2-ylene group and a 2,5-cyclohexadien-1,4-ylene group, and r is generally 10 to 2000, preferably 50 to 1000.

In the above, a saturated aliphatic dicarboxylic acid may be co-used together with a polycarb cxylic acid containing a polymerizable double bond and a polyamino compound.

The typical examples of the above polycarboxylic acids containing a polymerizable dduble bond are maleic acid, fumaric acid, itaconic acid, mesaconic acid, citraconic acid, crotonic acid, etc., those of the polyhydroxy compounds are ethylene glycol, diethyl ne glycol, propylene glycol, butylene glycol, etc., those of the polyamino acids are ethylenediamine, propylenediamine, butylenediamine, etc.

And those of the saturated aliphatic carboxylic acids are adipic acid, succinic acid, sebacic acid, etc.

As the 1st polymer compound and/or the 2nd polymer compound of the present invention, thus non-cross-linked polymer, those containing an aromatic ring in the molecule are preferable.

And as the aromatic rings, those originated from the glycidyl ether or glycidyl ester shown by the general formula [1] or [2] wherein $R^9$ is an arylene group having 6 to 9 carbon atoms or an aryl lower alkylene group having 7 to 12 carbon atoms, and/or those originated from compounds shown by the general formula [8] wherein $R^{21}$ is an aryl group having 6 to 9 carbon atoms or an aralkyl group having 7 to 12 carbon atoms are preferable.

Further, those obtained by using the monomer classified into the glycidyl compound shown by the general formula [1] or [2] are preferable, regardless of whether or not they contain an aromatic ring.

The preferable example of the non-cross-linked polymer compound is a copolymer of a glycidyl compound selected from (1) a glycidyl compound containing an epoxy group as the cross-linkable condensing functional group selected from glycidyl ethers or glycidyl esters shown by the general formula [1] or [2]

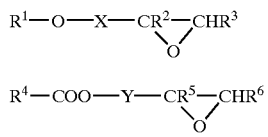

[1]

[2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

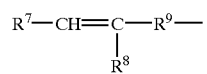

[3]

wherein $R^7$ is a hydrogen atom o r a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group, shown by the following general formula [4]

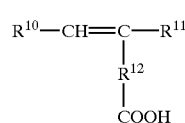

[4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

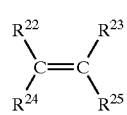

[8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms and $R^{24}$ is a cyano group, a carboxyl group, a carboxyamide group, a hydroxyl group, a lower acyloxy group having 2 to 6 carbon atoms, a lower alkoxycarbonyl group having 2 to 6 carbon atoms, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, wherein the glycidyl compound is 0.1 to 10 g and the monomers containing the polymerizable double bond is 1 to 100 g, respectively relative to 1 g of the monomers containing the carboxyl group, a molecular weight of the copolymer is 1000 to 200000, and an amount of osmium tetroxide is 0.00001 to 0.01 mol relative to 1 g of the copolymer and the much preferable example of the non-cross-linked polymer compound is a copolymer of a glycidyl compound selected from (1) a glycidyl compound containing an epoxy group as the cross-linkable condensing functional group selected from glycidyl ethers or glycidyl esters shown by the general formula [1] or [2]

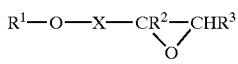  [1]

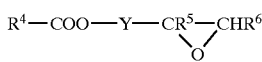  [2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

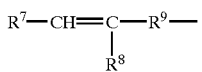  [3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group, shown by the following general formula [4]

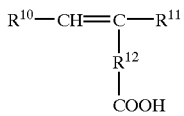  [4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

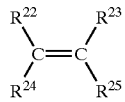  [8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms and $R^{24}$ is an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, wherein the glycidyl compound is 0.1 to 10 g and the monomers containing the polymerizable double bond is 1 to 100 g, respectively relative to 1 g of the monomers containing the carboxyl group, a molecular weight of the copolymer is 1000 to 200000, and an amount of osmium tetroxide is 0.00001 to 0.01 mol relative to 1 g of the copolymer.

And the preferable specific examples of the non-cross-linked polymer compounds are copolymers of the three components, namely ① a glycidyl compound represented by a glycidyl ether such as vinylbenzylglycidyl ether and vinylphenylglycidyl ether, and a glycidyl ester such as glycidyl vinylbenzoate and glycidyl vinylphenylacetate, ② an acrylic acid type monomer such as acrylic acid and methacrylic acid, and ③ a polymerizable monomer containing an aromatic ring represented by a styrene type monomer such as styrene and methylstyrene.

In the above specific examples, 0.1 to 10 g of the glycidyl ether or glycidyl ester and 1 to 100 g of the styrene type monomer are respectively used relative to 1 g of the acrylic type monomer.

A molecular weight of the 1st polymer compound or the 2nd polymer compound of the present invention is generally 1,000 to 200,000, preferably 5,000 to 100,000.

In the present invention, the 1st polymer compound and/or 2nd polymer compound which is a non-cross-linked polymer compound is dissolved in a solvent first.

The solvent may be any one which can dissolve the polymer compound and includes a ketone such as acetone, a carboxylic acid ester such as ethyl acetate, an aromatic hydrocarbon such as toluene and xylene, an ether such as tetrahydrofuran and dioxane, etc.

A metal compound is homogeneously dissolved or dispersed in thus prepared solution of the polymer compound.

An amount of the metal compound is generally 0.00001 to 0.01 mole, preferably 0.00005 to 0.005 mol relative to 1 g of the non-cross-linked polymer compound giving the cross-linked polymer compound by cross-linking:

Then, as occasion demands, the solution itself in which the metal compound is dissolved or dispersed is subjected to a cross-linking reaction, or a poor solvent to the polymer compound such as methanol and hexane is added to the solution, followed by separation, and then the polymer compound is subjected to a cross-linking reaction.

In this way, an object compound is obtained by the metal compound being homogeneously carried on the cross-linked polymer compound.

The cross-linking reaction can be conducted after a known manner for cross-linking of polymer compounds, such as a method by heat reaction, a method using a cross-linking agent, a method for condensation reaction and a method using a radical polymerization catalyst including a peroxide, an azo compound, etc.

That is, the 1st polymer compound containing an epoxy group as the cross-linkable condensing functional group such as a polymer compound containing a monomer unit derived from the monomer shown by the general formula [1] or [2] and a polymer compound shown by the general formula [10] can be cross-linked only by heating.

And also the 1st polymer compound containing both of a monomer unit derived from the monomer containing an epoxy group shown by the general formula [1] or [2] on one hand and a monomer unit derived from the monomer containing a carboxyl group shown by the general formula [4], a monomer unit derived from the monomer containing a hydroxyl group shown by the general formula [5] or a monomer unit derived from the monomer containing an amino group shown by the general formula [7] on the other hand can be cross-linked only by heating.

Additionally, in a method using a cross-linking agent, the cross-linking reactions proceed by using the following cross-linking agent according to the kind of the condensing functional groups.

The cross-linking reactions proceed by using a cross-linking agent including a polyamine compound such as hexamethylenediamine and hexamethylenetetramine, a polyol such as ethylene glycol, propylene glycol and glycerin, a polycarboxylic acid such as malonic acid, succinic acid, glutaric acid, adipic acid, pimelic acid, maleic acid and fumaric acid and their anhydrides, etc., in the polymers containing an epoxy group as the condensing functional group such as one containing a monomer unit derived from the monomer shown by the general formula [1] or [2] and one shown by the general formula [10], a polyhydroxy compound such as ethylene glycol and glycerin, an alkylene oxide compound such as ethylene oxide and propylene oxide, etc., in the polymers containing a carboxyl group as the condensing functional group such as one containing a monomer unit derived from the monomer shown by the general formula [4] and one shown by the general formula [9], a polycarboxylic acid such as malonic acid, succinic acid, glutaric acid, adipic acid, pimelic acid, maleic acid and fumaric acid and their anhydrides, an alkylene oxide compound such as ethylene oxide and propylene oxide, a polyamine compound such as hexamethylenediamine and hexamethylenetetramine, etc., in the polymers containing a hydroxyl group and/or an acyloxy group as the condensing functional group such as one containing a monomer unit derived from the monomer shown by the general formula [5] and one shown by the general formula [9], water, a polyhydroxy compound such as ethylene glycol and glycerin, a polycarboxylic acid such as malonic acid, succinic acid, glutaric acid, adipic acid, pimelic acid, maleic acid and fumaric acid and their anhydrides, a polyamine compound such as hexamethylenediamine and hexamethylenetetramine, etc., in the polymers containing an isocyanate group or isothiocyanate group as the condensing functional group such as one containing a monomer unit derived from the monomer shown by the general formula [6], an alkylene oxide compound such as ethylene oxide and propylene oxide, etc., in the polymers containing an amino group as the condensing functional group such as one containing a monomer unit derived from the monomer shown by the general formula [7] and one shown by the general formula [9], and so on.

Additionally, the cross-linking reaction proceed by using a dehydration-condensation agent including carbodiimide such as dicyclohexylcarbodiimide, etc., in the polymers containing a carboxyl group and an amino group as the condensing functional group such as one shown by the general formula [9].

Some of the above-mentioned cross-linking reactions are shown by the following schemes.

(a) cross-linking of an epoxy group by heating

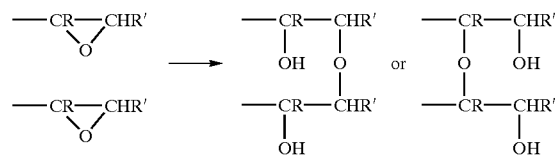

(R=$R^2$, $R^5$ or $R^{5'}$; R'=$R^3$, $R^6$ or $R^{6'}$)
(the polymer of the monomer shown by the general formula [1], [2] or [10])

(b) cross-linking of an epoxy group with a carboxyl group by heating

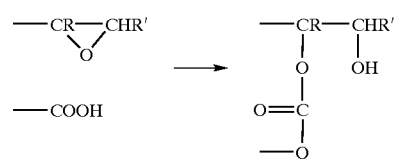

(R=$R^2$ or $R^5$, R'=$R^3$ or $R^6$)
(the polymer of the monomer shown by the general formula [1] or [2] with the monomer shown by the general formula [4])

(c) cross-linking of an epoxy group with a hydroxyl group by heating

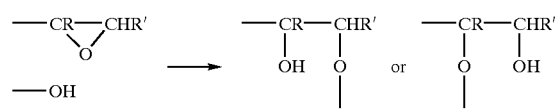

(R=$R^2$ or $R^5$, R'=$R^3$ or $R^6$)
(the polymer of the monomer shown by the general formula [1] or [2] with the monomer shown by the general formula [5])

(d) cross-linking of an epoxy group with an amino group by heating

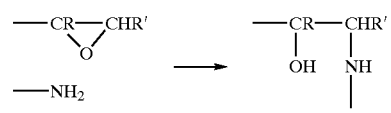

(R=$R^2$ or $R^5$; R'=$R^3$ or $R^6$)
(the polymer of the monomer shown by the general formula [1] or [2] with the monomer shown by the general formula [7])

(e) cross-linking of an epoxy group by a polyamine

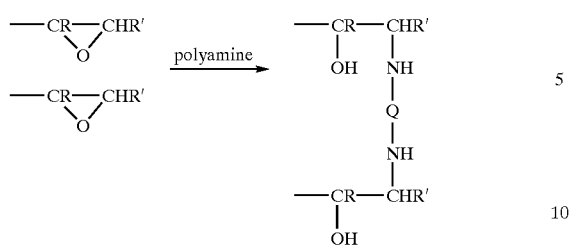

(R=R$^2$, R$^5$ or R$^{5'}$; R'=R$^3$, R$^6$ or R$^{6'}$; —NH—Q—NH—=derived from a diamine)
(the polymer of the monomer shown by the general formula [1], [2] or [10])

(f) cross-linking of epoxy group by a polyol

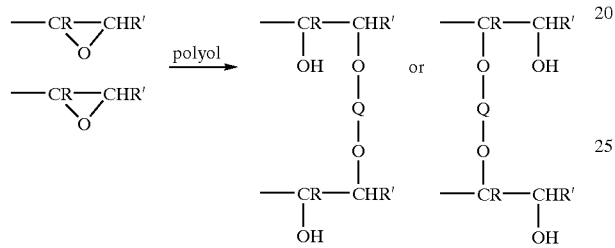

(R=R$^2$, R$^5$ or R$^{5'}$; R'=R$^3$, R$^6$ or R$^{6'}$; —O—Q—O—=derived from a diol)
(the polymer of the monomer shown by the general formula [1], [2] or [10])

(g) cross-linking of an epoxy group by a polycarboxylic acid

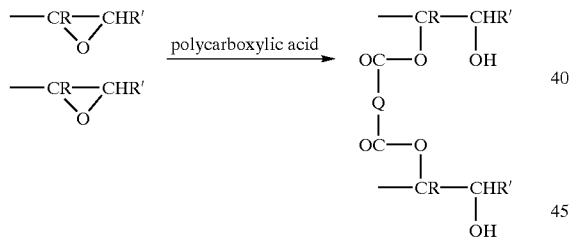

(R=R$^2$, R$^5$ or R$^{5'}$; R'=R$^3$, R$^6$ or R$^{6'}$; —OOC—Q—COO—=derived from a dicarboxylic acid)
(the polymer of the monomer shown by the general formula [1], [2] or [10])

(h) cross-linking of a carboxyl group by a polyhydroxy or an alkylene oxide compound

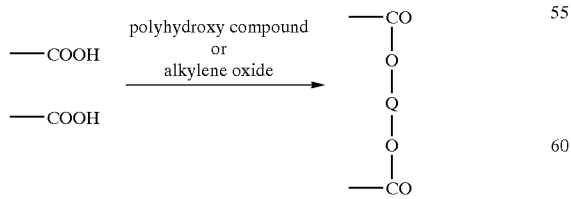

(—O—Q—O—=derived from a dihydroxy compound or an alkylene oxide)
(the polymer of the monomer shown by the general formula [4] or [9])

(i) cross-linking of a hydroxyl group or an acyloxy group by a polyamine

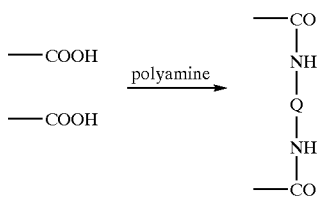

(—HN—Q—NH—=derived from a diamine)
(the polymer of the monomer shown by the general formula [4] or [9])

(j) cross-linking of a hydroxyl group or an acyloxy group by a polycarboxylic acid

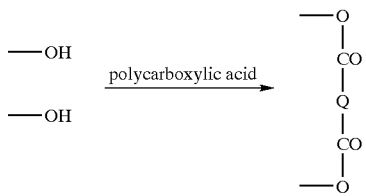

(—OOC—Q—COO—=derived from a dicarboxylic acid)
(the polymer of the monomer shown by the general formula [5] or [9])

(k) cross-linking of a hydroxyl group or an acyloxy group by an alkylene oxide

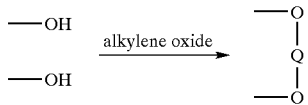

(—O—Q—O—=derived from an alkylene oxide)
(the polymer of the monomer shown by the general formula [5] or [9])

(l) cross-linking of an isocyanate group or an isothiocyanate group by water

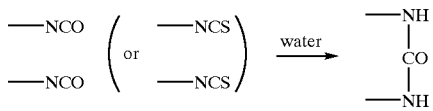

(the polymer of the monomer shown by the general formula [6])

(m) cross-linking of an isocyanate group or an isothiocyanate group by a polyhydroxy compound

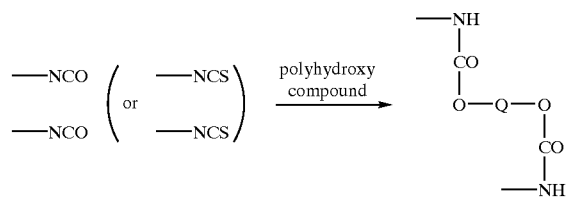

(—O—Q—O—=derived from a dihydroxy compound)
(the polymer of the monomer shown by the general formula [6])

(n) cross-linking of an isocyanate group or an isothiocyanate group by a polycarboxylic acid

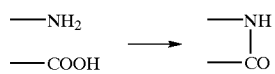

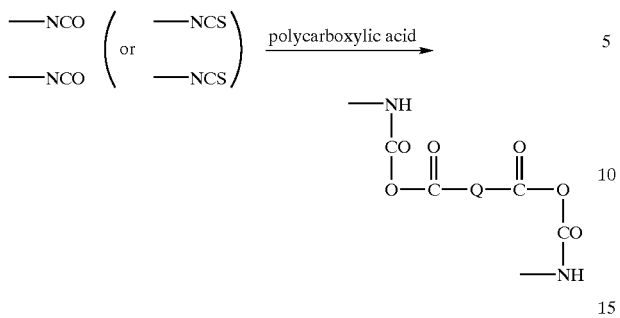

(—O—CO—Q—OC—O—=derived from a dicarboxylic acid)
(the polymer of the monomer shown by the general formula [6])

(o) cross-linking of an isocyanate group or an isothiocyanate group by a polyamine

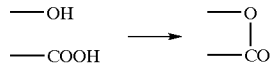

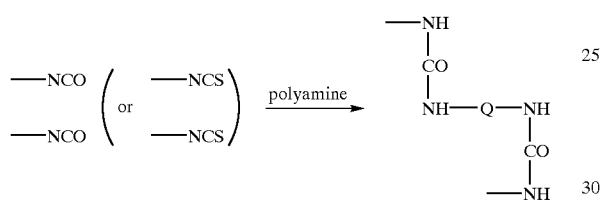

(—HN—Q—NH—=derived from a diamine)
(the polymer of the monomer shown by the general formula [6])

(p) cross-linking of an amino group and a carboxyl group

—NH$_2$   →   —NH
—COOH          —CO (the polymer of the monomer shown by the general formula [9] or the polymer of the monomer shown by the general formula [4] with the monomer shown by the general formula [7])

(q) cross-linking of a hydroxyl group and a carboxyl group

—OH   →   —O
—COOH        —CO (the polymer of the monomer shown by the general formula [9] or the polymer of the monomer shown by the general formula [4] with the monomer shown by the general formula [5])

Further, in the case of using the 2nd polymer compound containing a polymerizable double bond as the non-cross-linked polymer compound, the cross-linking reaction can be conducted by allowing a catalyst including a peroxide such as benzoyl peroxide, an azo compound such as 2,2'-azobisisobutylonitrile to act in the presence or absence of a monomer containing a polymerizable double bond such as maleic anhydride.

When vinyl glycidyl ether, acrylic acid and styrene are used as the starting monomers, one scheme of reactions is shown in the following.

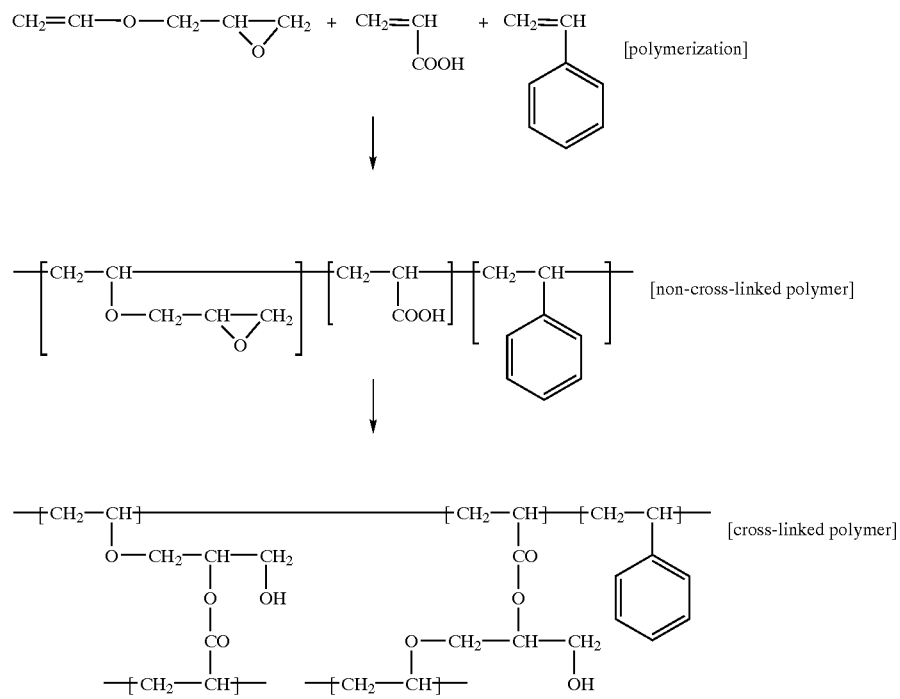

Specific means, reaction conditions and amounts of the compounds, etc. for the cross-linking reactions can be selected from those in known conventional ones.

The metal compound of the present invention includes metal oxides, Lewis acid containing metal atoms, among which those having catalytic activities for various reactions are preferable.

The metal oxide includes an osmium oxide such as Osmium dioxide and Osmium tetroxide, a chromium oxide such as $Cr_2O_3$, $CrO_2$, $CrO_3$, $Cr_5O_{12}$, $Cr_2O_5$ and $CrO_5$, a cobalt oxide such as CoO and $Co_3O_4$, a ruthenium oxide such as $RuO_2$ and $RuO_4$, etc.

The metallic Lewis acid includes complexes formed by binding a transitional metal such as osmium, scandium, titanium, vanadium, chromium, manganese, iron, cobalt, nickel, copper, zinc, iridium, zirconium, ruthenium, rhodium, palladium, silver, cadmium, platinum and gold, a half metal such as boron, a metal such as aluminum, etc. to an anion atom or atom group such as halogen, sulfonic acid, cyanide, ammonium and carbonyl, the typical examples of which are $AlCl_3$, $TiCl_4$, $ZnCl_2$, $AgCl$, $Co(NH_3)_6$, $Ni(Co)_4$, $PtCl_2(NH_3)_2$, $Sc(CF_3SO_3)_3$, etc.

In this way, there can be obtained the cross-linked polymer compounds on which the metal compound such as the metal oxide and the metallic Lewis acid is carried under homogeneously dispersed state.

In the cross-linked polymer compound carrying the metal, the effect of the metal compound itself carried on can constantly be expressed for a long period of time, and the polymer compound has excellent durability and solvent resistance, and therefore, there is observed no reduction of its activity even after many time repeating use.

Further, even the metal compound carried on is not easy to handle because of its toxicity, etc., the metal compound can be effectively treated without taking care its toxicity because it is held in a cross-linked polymer compound.

The metal compound carried on the cross-linked polymer compound of the present invention can be used in industrial scale as catalysts for various kinds of reactions by virtue of the excellent characteristics as mentioned above.

In the following, the present invention is further explained in detail referring to Examples, but it is not limited thereto by any means.

EXAMPLE

Example 1

To 100 mL of toluene were added 0.5 g of methacrylic acid (MAA), 2.2 g of vinylbenzylglycidyl ether (VBGE), 47.3 g of styrene (ST) and 3 g of 2,2'-azobis(2,4-dimethylvaleronitrile) (Trade Name; V-65, manufactured and sold by Wako Pure Chemical Industries, Ltd.), followed by polymerization at 70° C. for 5 hours with stirring. After polymerization, 10 g of the polymer solution were poured into 200 mL of hexane to precipitate out the polymer. The precipitated polymer was separated and dissolved again in 50 mL of tetrahydrofuran, and 200 mL of hexane were added thereto to reprecipitate the polymer. The reprecipitated polymer was separated and dried at room temperature under reduced pressure to give 2 g of white powdery polymer (Mn: 4970, Mw: 7870).

In 20 mL of tetrahydrofuran were dissolved 2 g of the obtained polymer, and 400 mg of osmium tetroxide was added thereto, followed by stirring at room temperature for 1 hour. The reaction solution was poured into 100 mL of hexane, whereby osmium tetroxide was carried on the polymer. The obtained compound was dried at room temperature under reduced pressure for 1 hour, and heated at 130° C. for 2 hours to cause self-cross-linking reaction, whereby 2.4 g of the desired metal oxide carried on a cross-linked polymer compound (the present metal oxide composition) was obtained.

Examples 2 to 4

Metal oxides carried on a cross-linked polymer compound were obtained by the same manner as Example 1 except for amounts of starting materials as mentioned in Table 1. Amounts of the monomers used as materials, a rate of the metal oxide in the metal oxide composition and a molecular weight of the polymer compound before cross-linking were also shown in Table 1.

TABLE 1

|  | MAA (g) | VBGE (g) | ST (g) | V-65 (g) | $OsO_4$ (%) | Mn | Mw | Mw/Mn |
| --- | --- | --- | --- | --- | --- | --- | --- | --- |
| Example 1 | 0.5 | 2.2 | 47.3 | 3 | 16.6 | 4970 | 7870 | 1.583 |
| Example 2 | 3 | 13.3 | 33.7 | 3 | 13.0 | 4239 | 7438 | 1.755 |
| Example 3 | 3 | 13.3 | 33.7 | 1 | 11.1 | 3924 | 7775 | 1.981 |
| Example 4 | 5 | 22 | 23 | 3 | 12.5 | 7913 | 14354 | 1.814 |

Experimental Example 1

To 9 mL of a solvent consisting of water-acetone-acetonitrile (1:1:1) were added 1 g of styrene, 1.5 g of N-methylmorpholine-N-oxide and 1.24 g of the metal oxide carried on the cross-linked polymer compound which was obtained in Example 2, followed by allowing a reaction to take place at room temperature for 5 hours with stirring. After the reaction, the metal oxide carried on the cross-linked polymer compound was recovered by filtration from the reaction solution, and the reaction solution was extracted with ethyl acetate and the organic layer was washed with water, concentrated and purified by column chromatography to give 1.2 g of 1-phenyl-1,2-ethanediol (yield: 86.2%).

Then, the recovered metal oxide carried on the cross-linked polymer compound was washed with methanol and a diol reaction of styrene was conducted after the same manner as above, and the metal oxide carried on the cross-linked polymer compound was again recovered. This step of processes was repeated several times.

Recovering rates in each step were shown in Table 2.

TABLE 2

| Step | 1 | 2 | 3 | 4 | 5 | 6 | 7 |
|---|---|---|---|---|---|---|---|
| Compound obtained in Example 2 | 86.2% | 89.1% | 92.0% | 87.7% | 90.5% | — | — |
| Compound obtained in Example 3 | 97.8% | 86.2% | 87.7% | 90.3% | 89.8% | — | — |
| Compound obtained in Example 4 | 87.7% | 92.0% | 94.2% | 87.0% | 90.5% | 90.5% | 88.4% |

Experimental Examples 2 and 3

A diol reaction of styrene was conducted after the same manner as in Experimental Example 1 except for using the metal oxides carried on the cross-linked polymer compound which were obtained in Example 3 and 4, respectively.

Yields of the diol in each step were also shown in Table 2.

As clear from the result in Experimental Examples 1 to 3, it was understood that the metal oxide carried on the cross-linked polymer compound of the present invention could be recovered quantitatively and the catalytic activity was not reduced even after repeating use.

The present invention provides a catalytic active substance such as a metal oxide and a Lewis acid having high solvent resistance and heat resistance, wherein no reduction of its activity is observed even after repeating use and which can easily be handled, and the metal oxide carried on a cross-linked polymer compound of the present invention can constantly express the activity of the carried metal oxide itself for a long period of time and additionally shows high durability and high solvent resistance, and therefore there is observed no reduction in its activity even after many times repeating use, and for this reason, the metal oxide is extraordinary useful as catalysts for various kinds of reactions.

Further, the present metal oxide can effectively be handled without taking care of toxicity, because it is carried on a cross-linked polymer compound, even if the metal oxide itself is not easily to handle from view point of its toxicity, etc.

The metal oxide carried on a cross-linked polymer compound of the present invention can be used industrially as catalysts for various kinds of reactions because of its excellent characteristics as mentioned above.

This patent application is based on Japanese Patent Application No. 2000-179823, which is incorporated by reference to the same extent as if it were forth in its entirety herein.

What is claimed is:

1. A metal oxide or metallic Lewis acid composition comprising the metal oxide or the metallic Lewis acid carried on a cross-linked polymer compound which is a cross-linked product of a 1st polymer compound obtained by copolymerizing (1) a glycidyl compound containing an epoxy group as the cross-linkable condensing functional group selected from glycidyl ethers or glycidyl esters shown by the general formula [1] or [2]

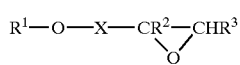  [1]

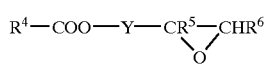  [2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

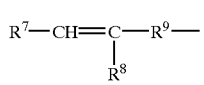  [3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, and (2) a monomer containing a carboxyl group as the cross-linkable condensing functional group, shown by the following general formula [4]

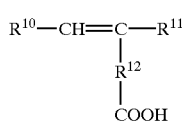  [4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms.

2. The composition according to claim 1, wherein $R^9$ of the general formula [3] is an arylene group having 6 to 9 carbon atoms or an aryl lower alkylene group having 7 to 12 carbon atoms.

3. A metal oxide or metallic Lewis acid composition comprising the metal oxide or the metallic Lewis acid carried on a cross-linked polymer compound which is a cross-linked product of a 1st polymer compound obtained by copolymerizing (1) a glycidyl compound containing an epoxy group as the cross-linkable condensing functional group selected from glycidyl ethers or glycidyl esters shown by the general formula [1] or [2]

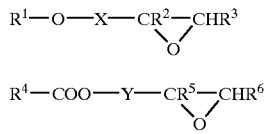

[1]

[2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

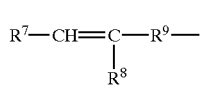

[3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group, shown by the following general formula [4]

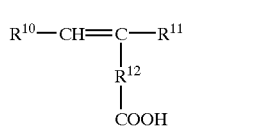

[4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

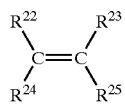

[8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms, and $R^{24}$ is a cyano group, a carboxyl group, a carboxyamide group, a hydroxyl group, a lower acyloxy group having 2 to 6 carbon atoms, a lower alkoxycarbonyl group having 2 to 6 carbon atoms, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group.

4. The composition according to claim 3, wherein $R^6$ of the general formula [3] is an arylene group having 6 to 9 carbon atoms or an aryl lower alkylene group having 7 to 12 carbon atoms and/or $R^{24}$ of the general formula [8] is an aryl group having 6 to 9 carbon atoms or an aralkyl group having 7 to 12 carbon atoms.

5. A metal oxide or metallic Lewis acid composition comprising the metal oxide or the metallic Lewis acid carried on a cross-linked polymer compound which is a cross-linked product of a 1st polymer compound obtained by copolymerizing (1) a glycidyl ether or a glycidyl ester, (2) an acrylic acid type monomer selected from the group consisting of acrylic acid and methacrylic acid, and (3) a styrene type monomer selected from the group consisting of styrene and methylstyrene.

6. The composition according to claim 5, wherein the glycidyl ether is vinylbenzyl glycidyl ether or vinylphenylacetate.

7. The composition according to claim 5, wherein the glycidyl ether is vinylbenzyl glycidyl ether, the acrylic type monomer is methacrylic acid and the styrene type monomer is styrene.

8. The composition according to claim 5, wherein the glycidyl ether or the glycidyl ester is 0.1 to 10 g and the styrene type monomer is 1 to 100 g, respectively relative to 1 g of the acrylic acid type monomer.

9. The composition according to claim 1, 3 or 5, wherein a molecular weight of the 1st polymer compound is 1000 to 200000.

10. The composition according to claim 1, 3 or 5, wherein the cross-linked polymer compound is one obtained by heating the 1st polymer compound or reacting the 1st polymer compound with a cross-linking agent.

11. The composition according to claim 1, 3 or 5, wherein the metal oxide is an osmium oxide, a ruthenium oxide, a cobalt oxide or a chromium oxide and the metallic Lewis acid is $AlCl_3$, $TiCl_4$, $AgCl$, $Co(NH_3)_6$, $Ni(Co)_4$, $PtCl_2(NH_3)_2$ or $Sc(CF_3SO_3)_3$.

12. The composition according to claim 11, wherein the osmium oxide is osmium tetroxide.

13. The composition according to claim 1, 3 or 5, wherein an amount of the metal oxide or the metallic Lewis acid is 0.00001 to 0.01 mol relative to 1 g of a polymer compound which gives the cross-linked polymer compound by cross-linking.

14. A catalyst for a reaction, comprising the composition in any one of claims 1–9 and 10–13.

15. A metal compound composition comprising the metal compound carried on a cross-linked polymer compound of a 1st polymer compound containing a cross-linkable condensing functional group obtained by copolymerizing (1) a glycidyl compound containing an epoxy group as the cross-linkable condensing functional group selected from glycidyl ethers or glycidyl esters shown by the general formula [1] or [2]

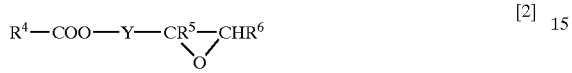

wherein $R^2$, $R^3$, $R^5$ and $R^6$ are each independently a hydrogen atom, a straight chained, branched or cyclic lower alkyl. group having 1 to 6 carbon atoms, X and Y are each independently a straight chained, branched or cyclic. lower alkylene group having 1 to 6 carbon atoms, $R^1$ and $R^4$ are each independently a group shown by the following general formula [3]

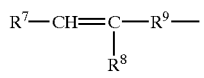

wherein $R^7$ is a hydrogen atom or a straight chained, branched or cyclic lower alkyl group having 1 to 6 carbon atoms, $R^8$ is hydrogen atom, a cyano group or a straight chained, branched or cyclic lower alkyl group having 1 to 6 carbon atoms, $R^9$ is direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, and (2) a monomer containing a carboxyl group as the cross-linkable condensing functional group, shown by the following general formula [4]

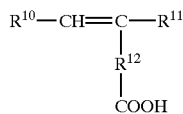

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, or obtained by copolymerizing (1) a glycidyl compound containing an epoxy group as the cross-linkable condensing functional group selected from glycidyl ethers or glycidyl esters shown by the general formula [1] or [2]

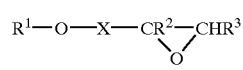
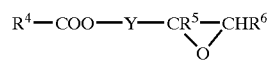

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

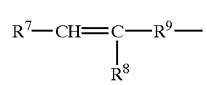

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group shown by the following general formula [4]

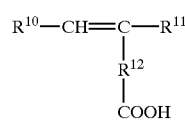

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

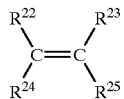

[8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms, and $R^{24}$ is a cyano group, a carboxyl group, a carboxyamide group, a hydroxyl group, a lower acyloxy group having 2 to 6 carbon atoms, a lower alkoxycarbonyl group having 2 to 6 carbon atoms, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group.

16. A method for producing a metal compound composition comprising the metal compound carried on a cross-linkable polymer compound, which comprises mixing a 1st polymer compound containing a cross-linkable condensing functional group obtained by copolymerizing (1) a glycidyl compound containing an epoxy group as the cross-linkable condensing functional group selected from glycidyl ethers or glycidyl esters shown by the general formula [1] or [2]

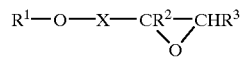

[1]

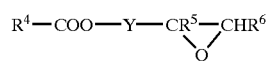

[2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

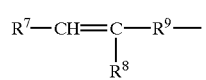

[3]

wherein $R^7$ is a hydrogen atom or a straight chained, branched or cyclic lower alkyl group having 1 to 6 carbon atoms, $R^8$ is hydrogen atom, a cyano group or a straight chained, branched or cyclic lower alkyl group having 1 to 6 carbon atoms, $R^9$ is direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, and (2) a monomer containing a carboxyl group as the cross-linkable condensing functional group, shown by the following general formula [4]

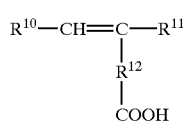

[4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, or obtained by copolymerizing (1) a glycidyl compound containing an epoxy group as the cross-linkable condensing functional group selected from glycidyl ethers or glycidyl esters shown by the general formula [1] or [2]

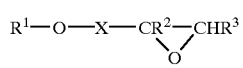

[1]

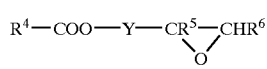

[2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

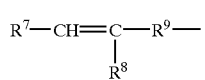

[3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group shown by the following general formula [4]

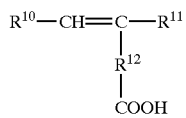 [4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

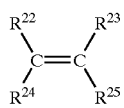 [8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms, and $R^{24}$ is a cyano group, a carboxyl group, a carboxyamide group, a hydroxyl group, a lower acyloxy group having 2 to 6 carbon atoms, a lower alkoxycarbonyl group having 2 to 6 carbon atoms, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group with the metal compound and then cross-linking said polymer compounds.

17. The method according to claim 16, wherein the metal compound is a metal oxide or a metallic Lewis acid.

18. The method according to claim 16, wherein an amount of monomer units derived from (1) the glycidyl compound in the 1st polymer compound is 0.0001 to 0.02 mole relative to 1 g of the 1st polymer compound.

19. The method according to claim 16, wherein the way of the cross-linking step is selected from the group consisting of a method conducted by heating, a method conducted in the presence of a cross-linking agent, a method conducted by condensation reaction and a method conducted in the presence of a catalyst for a radical polymerization.

20. A method for improving a solvent resistance, a heat resistance and a durability of a metal compound, comprising mixing a 1st polymer compound containing a cross-linkable condensing functional group obtained by copolymerizing (1) a glycidyl compound containing an epoxy group as the cross-linkable condensing functional group selected from glycidyl ethers or glycidyl esters shown by the general formula [1] or [2]

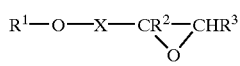 [1]

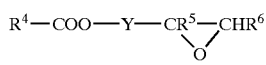 [2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

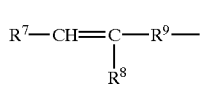 [3]

wherein $R^7$ is a hydrogen atom or a straight chained, branched or cyclic lower alkyl group having 1 to 6 carbon atoms, $R^8$ is hydrogen atom, a cyano group or a straight chained, branched or cyclic lower alkyl group having 1 to 6 carbon atoms, $R^9$ is direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, and (2) a monomer containing a carboxyl group as the cross-linkable condensing functional group, shown by the following general formula [4]

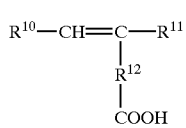 [4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, or obtained by copolymerizing (1) a glycidyl compound containing an epoxy group as the cross-linkable condensing functional group selected from glycidyl ethers or glycidyl esters shown by the general formula [1] or [2]

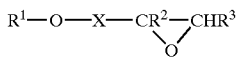 [1]

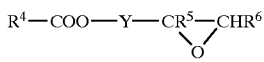 [2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown, by the following general formula [3]

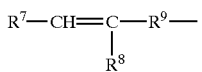 [3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and R2 may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group shown by the following general formula [4]

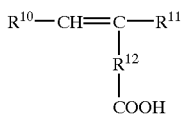 [4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

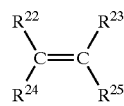 [8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms, and $R^{24}$ is a cyano group, a carboxyl group, a carboxyamide group, a hydroxyl group, a lower acyloxy group having 2 to 6 carbon atoms, a lower alkoxycarbonyl group having 2 to 6 carbon atoms, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, with the metal compound, and then cross-linking said polymer compounds.

21. Osmium tetroxide composition comprising osmium tetroxide carried on a cross-linked polymer compound obtained by cross-linking a copolymer of a glycidyl compound, a monomer containing a carboxyl group and a monomer containing a polymerizable double bond.

22. Osmium tetroxide composition comprising osmium tetroxide carried on a cross-linked polymer compound obtained by cross-linking a copolymer of (1) a glycidyl ether or a glycidyl ester, (2) an acrylic acid type monomer selected from the group consisting of acrylic acid and methacrylic acid and (3) a styrene type monomer selected from the group consisting of styrene and methylstyrene.

23. The composition according to claim 22, wherein the glycidyl ether is vinylbenzyl glycidyl ether, or vinylphenyl glycidyl ether, and the glycidyl ester is glycidyl vinylbenzoate or glycidyl vinylphenylacetate.

24. The composition according to claim 22, wherein the glycidyl ether is vinylbenzyl glycidyl ether, the acrylic acid type monomer is methacrylic acid and the styrene type monomer is styrene.

25. The composition according to claim 22, wherein the glycidyl ether or glycidyl ester is 0.1 to 10 g and the styrene type monomer is 1 to 100 g respectively relative to 1 g of the acrylic acid type monomer.

26. The composition according to claim 21, wherein a molecular weight of the copolymer is 1000 to 200000.

27. The composition according to claim 21, wherein an amount of osmium tetroxide is 0.00001 to 0.01 mol relative to 1 g of the copolymer.

28. Osmium tetroxide composition comprising osmium tetroxide carried on a cross-linked polymer compound obtained by cross-linking a copolymer of (1) a glycidyl compound selected from a glycidyl compound containing an epoxy group as the cross-linkable condensing functional group selected from glycidyl ethers or glycidyl esters shown by the general formula [1] or [2]

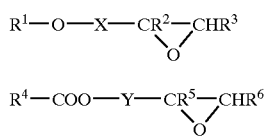  [1]

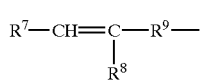  [2]

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

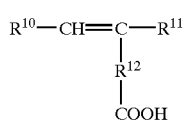  [3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group, shown by the following general formula [4]

$$R^{10}-CH=\underset{\underset{COOH}{\overset{|}{R^{12}}}}{\overset{|}{C}}-R^{11}$$  [4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

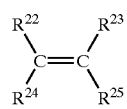  [8]

wherein $R^{22}$ and R23 are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms, and $R^{24}$ is a cyano group, a carboxyl group, a carboxyamide group, a hydroxyl group, a lower acyloxy group having 2 to 6 carbon atoms, a lower alkoxycarbonyl group having 2 to 6 carbon atoms, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, wherein the glycidyl compound is 0.1 to 10 g and the monomers containing the polymerizable double bond is 1 to 100 g, respectively relative to 1 g of the monomers containing the carboxyl group, a molecular weight of the copolymer is 1000 to 200000, and an amount of osmium tetroxide is 0.00001 to 0.01 mol relative to 1 g of the copolymer.

29. Osmium tetroxide composition comprising osmium tetroxide carried on a cross-linked polymer compound obtained by cross-linking a copolymer of (1) a glycidyl compound selected from a glycidyl compound containing an epoxy group as the cross-linkable condensing functional group selected from glycidyl ethers or glycidyl esters shown by the general formula [1] or [2]

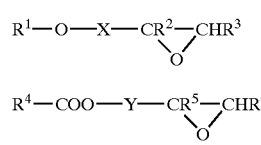

wherein $R^2$, $R^3$, $R^5$ and $R^6$ are each independently a hydrogen atom, a straight chained, branched or cyclic lower alkyl group having 1 to 6 carbon atoms, X and Y are each independently a straight chained, branched or cyclic lower alkylene group having 1 to 6 carbon atoms, $R^1$ and $R^4$ are each independently a group shown by the following general formula [3]

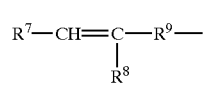  [3]

wherein $R^7$ is a hydrogen atom or a straight chained, branched or cyclic lower alkyl group having 1 to 6 carbon atoms, $R^8$ is a hydrogen atom, a cyano group or a straight chained, branched or cyclic lower alkyl group having 1 to 6 carbon atoms, $R^9$ is an arylene group having 6 to 9 carbon atoms or an aryl lower alkylene group having 7 to 12 carbon atoms, and $R^2$ may form a 3- to 6-membered ring together with $R^3$ or with a carbon atom in X, and $R^5$ may form a 3- to 6-membered ring together with $R^6$ or with a carbon atom in Y, (2) a monomer containing a carboxyl group as the cross-linkable condensing functional group, shown by the following general formula [4]

[4]

wherein $R^{10}$ is a hydrogen atom or a straight chained, branched or cyclic lower alkyl group having 1 to 6 carbon atoms, $R^{11}$ is a hydrogen atom, a straight chained, branched or cyclic lower alkyl group having 1 to 6 carbon atoms, an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, and $R^{12}$ is a direct link or a straight chained, branched or cyclic lower alkylene group having 1 to 6 carbon atoms, an arylene group having 6 to 9 carbon atoms or an aryl lower alkylene group having 7 to 12 carbon atoms, and (3) a monomer having a polymerizable double bond which is shown by the following general formula [8]

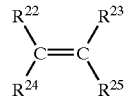

[8]

wherein $R^{22}$ and $R^{23}$ are each independently a hydrogen atom or a straight chained, branched or cyclic lower alkyl group having 1 to 6 carbon atoms, $R^{25}$ is a hydrogen atom, a halogen atom or a straight chained, branched or cyclic lower alkyl group having 1 to 6 carbon atoms, and $R^{24}$ is an aryl group having 6 to 9 carbon atoms or an aralkyl group having 7 to 12 carbon atoms, and the aromatic ring in the above aryl group and aralkyl group may have a substituent including a lower alkyl group having 1 to 4 carbon atoms, a lower alkoxy group having 1 to 4 carbon atoms, a halogen atom or a nitro group, wherein the glycidyl compound is 0.1 to 10 g and the monomers containing the polymerizable double bond is 1 to 100 g, respectively relative to 1 g of the monomers containing the carboxyl group, a molecular weight of the copolymer is 1000 to 200,000, and an amount of osmium tetroxide is 0.00001 to 0.01 mol relative to 1 g of the copolymer.

* * * * *